April 26, 1966  C. W. WEILAND  3,247,920
LABYRINTH SEAL FOR GROUND EFFECT VEHICLE
Filed Dec. 14, 1960  4 Sheets-Sheet 1
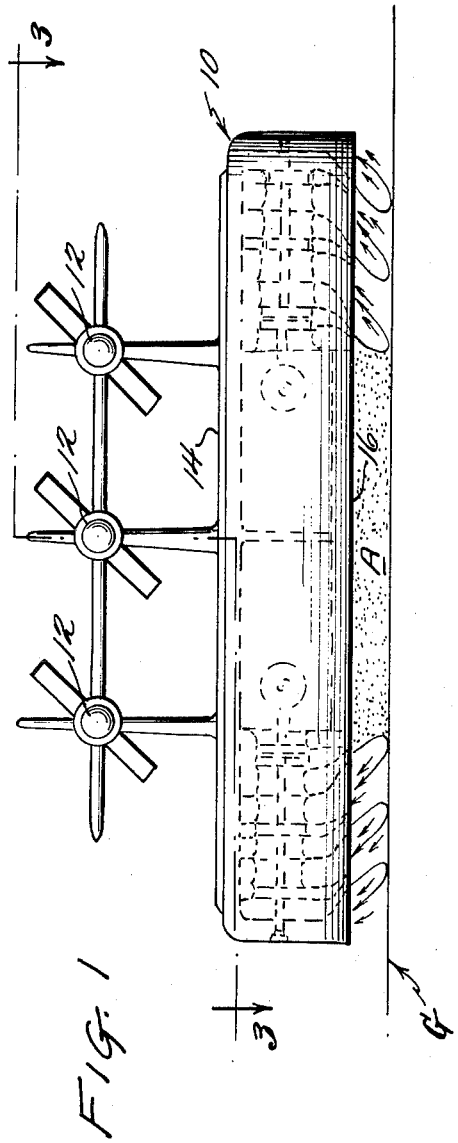
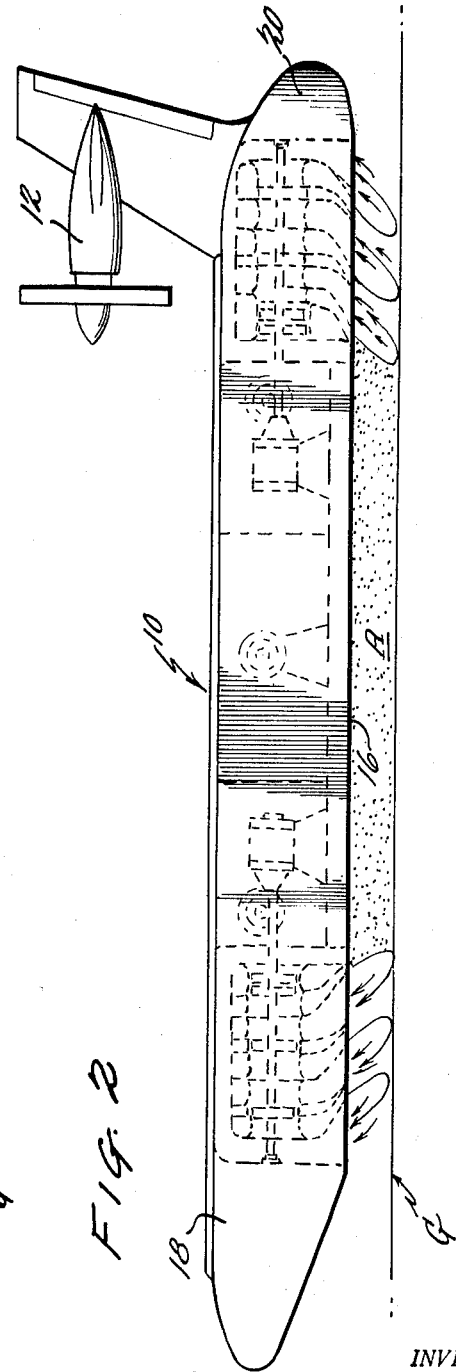
INVENTOR.
CARL W. WEILAND
BY
Cushman, Darby & Cushman
ATTORNEYS April 26, 1966 C. W. WEILAND 3,247,920
LABYRINTH SEAL FOR GROUND EFFECT VEHICLE
Filed Dec. 14, 1960 4 Sheets-Sheet 2
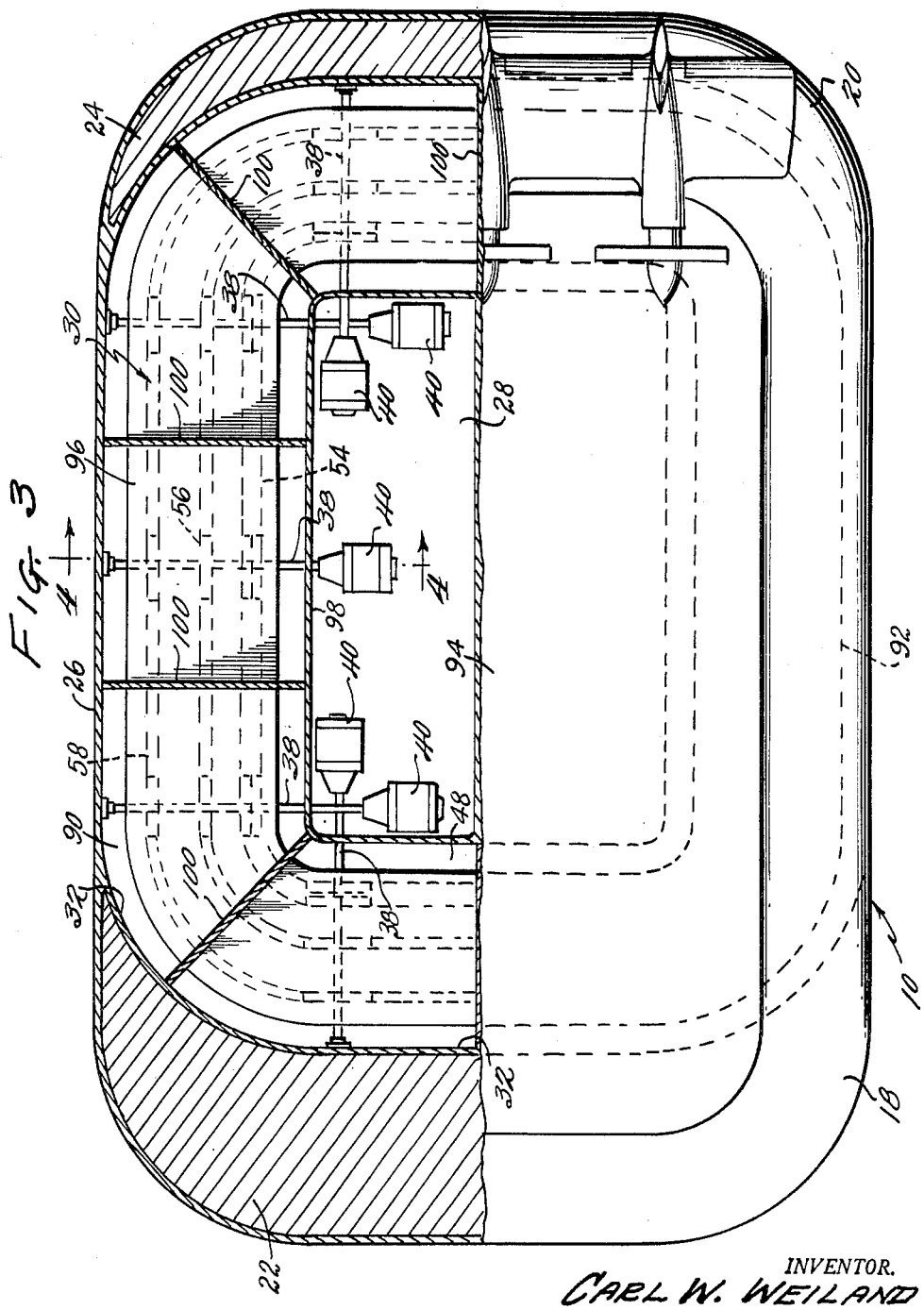
INVENTOR.
CARL W. WEILAND
BY
Cushman, Darby & Cushman
ATTORNEYS April 26, 1966  C. W. WEILAND  3,247,920
LABYRINTH SEAL FOR GROUND EFFECT VEHICLE
Filed Dec. 14, 1960  4 Sheets-Sheet 3
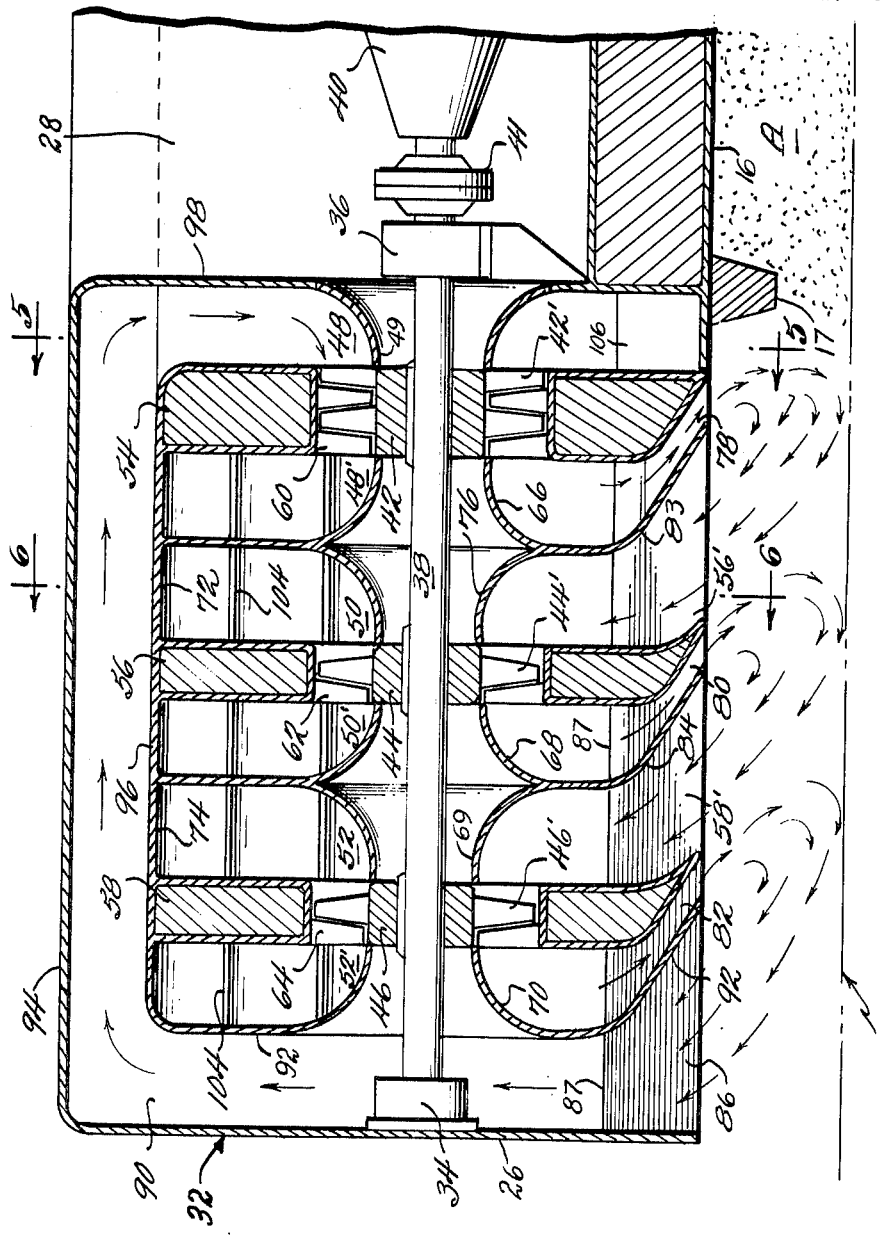
INVENTOR.
CARL W. WEILAND
BY
Cushman, Darby & Cushman
ATTORNEYS April 26, 1966

C. W. WEILAND 3,247,920

LABYRINTH SEAL FOR GROUND EFFECT VEHICLE

Filed Dec. 14, 1960

INVENTOR
CARL W. WEILAND

BY Cushman, Darby & Cushman
ATTORNEYS

United States Patent Office 3,247,920
Patented Apr. 26, 1966

3,247,920
LABYRINTH SEAL FOR GROUND
EFFECT VEHICLE
Carl Walter Weiland, % Aluminum Cruisers,
Standiford Field, Louisville, Ky.
Filed Dec. 14, 1960, Ser. No. 75,769
8 Claims. (Cl. 180—7)

This invention relates to ground effect vehicles, and more specifically to improvements in labyrinth sealing arrangements for peripheral jet ground effect vehicles of the type disclosed in my copending applications Serial No. 767,575, filed October 16, 1958, and 23,736, filed April 21, 1960.

Ground effect vehicles of the type disclosed in those applications are supported in close proximity to the ground on a cushion of air at superatmospheric pressure interposed between the under side of the vehicle and the ground. The cushion is created by what is now known as a "peripheral jet," i.e. a jet-like curtain of air directed downwardly and inwardly from the vehicle from about its entire periphery, or at least about the entire periphery of a central airtight undersurface. Of course, air from the cushion will tend to flow outwardly from between the ground and the vehicle about its entire periphery. Consequently, it is highly desirable to provide some means for impeding such outflow of air in order to conserve energy and thus reduce the power requirements for the vehicle.

Both of the aforementioned applications disclose means for impeding such outflow of air, i.e. for sealing the cushion, by an arrangement which has become known as a labyrinth sealing system. Such system involves the creation of a concentric series of downwardly and inwardly directed peripheral jets surrounding an innermost cushion-forming peripheral jet, with the air for each jet or curtain of the series being provided by sucking up air, just inwardly of the jet, from the air flowing outwardly from the cushion.

While the labyrinth sealing system disclosed in those applications perform their intended function, the retarding of the outflow of air from the cushion of a ground effect vehicle is of such primary importance to its efficient operation, that improvements in labyrinth sealing systems are desirable. In particular, in prior arrangements each peripheral jet of such a system has been created by a plurality of air impellers spaced along the periphery of the vehicle and feeding air to an endless jet or curtain-forming nozzle. The pressure of the several impellers renders difficult the uniform distribution of flow along the length of each curtain, unless an impractically large number of closely-spaced impellers is used.

It is accordingly an object of this invention to provide a new and improved labyrinth sealing system for a ground effect vehicle.

It is another object of this invention to provide a labyrinth sealing system for a ground effect vehicle which has increased aerodynamic efficiency and provides for more uniform distribution of flow along the length of each peripheral jet with a minimum number of air impellers.

Other objects and advantages of this invention will become evident from the following description and accompanying drawings in which:

FIGURE 1 is a front elevational view of a ground effect vehicle embodying this invention;

FIGURE 2 is a side elevational view of the ground effect vehicle shown in FIGURE 1;

FIGURE 3 is a plan view, partially in horizontal section, taken substantially along the line 3—3 of FIGURE 1;

Figure 5:
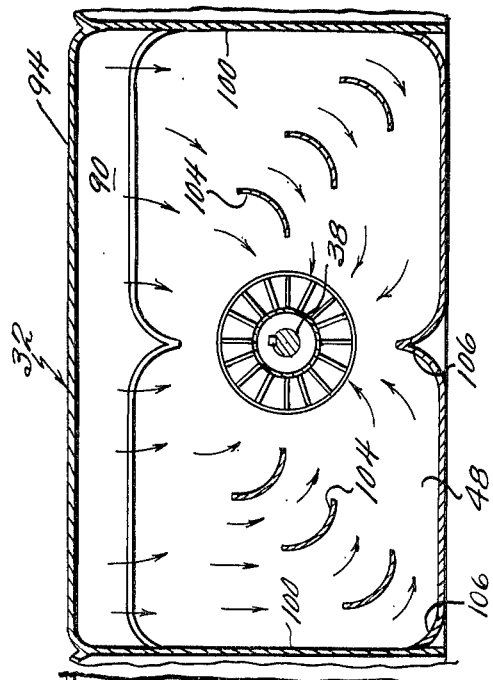
Figure 6:
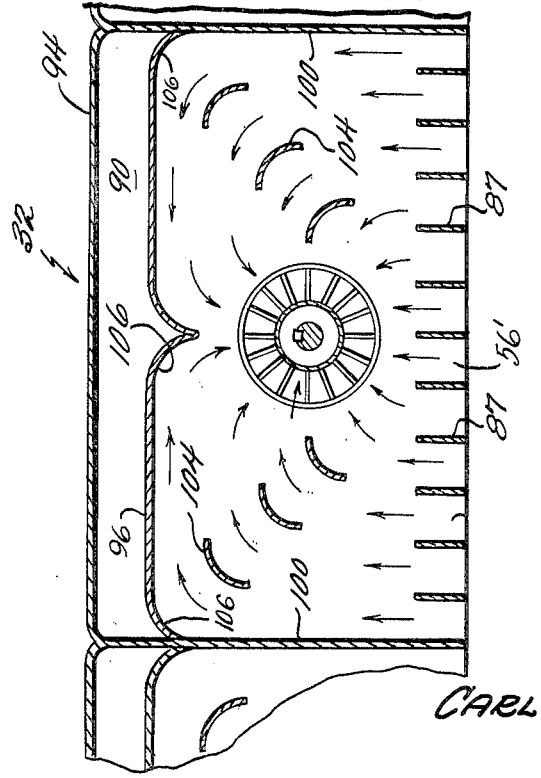

FIGURE 4 is an enlarged fragmentary vertical sectional view of a typical labyrinth sealing arrangement embodying this invention and taken along line 4—4 of FIGURE 3; and, FIGURES 5 and 6 are fragmentary sectional views taken respectively along lines 5—5 and 6—6 of FIGURE 4.

Referring now to the drawings, there is shown a ground effect vehicle 10 having propulsion means 12 which includes propellers mounted on the top 14 of the vehicle adjacent its aft end. In operation of the vehicle 10 the same is raised to a stable elevation above the ground by the creation, by means later described, of an air cushion A at superatmospheric pressure between a central airtight undersurface 16 of the vehicle and the ground G. The word "ground" is used herein in a generic sense to denote the surface of the earth and material thereon, as ground effect vehicles are adapted to move over land, water, mud, ice, snow, man-made surfaces, etc., as is well known.

The vehicle 10 may be provided with suitable skid means 17 (FIGURE 4) to support the vehicle when at rest on a solid surface. If desired, the vehicle 10 may be provided, at its front and rear ends 18 and 20, with buoyant or pontoon portions 22 and 24 (FIGURE 3) to enable the vehicle to float on water. Surrounding the periphery of the central undersurface 16 of the vehicle 10 is an arrangement, designated generally at 30 (FIGURE 3), which includes means for forming not only a cushion-creating peripheral jet, but also a labyrinth seal for such cushion. Such arrangement 30 is defined generally by a plurality of six-sided chamber assemblies 32 (FIGURES 3 and 4) disposed closely adjacent one another and having their interiors separated by common upright end walls 100. The outer sides of all the chamber assemblies 32 are defined by an upright peripheral wall 26, while the interior sides of all of the assemblies are defined by an upright interior peripheral wall 98. The tops of the chamber assemblies 32 may be defined by a common horizontal wall 94.

While certain of the chamber assemblies 32 are generally rectangular in plan view, as shown in FIGURE 3, and each will be described with respect to such a configuration, it will be realized that certain of the assemblies will have curved end portions, as shown in FIGURE 3. The same principles apply to both configurations, however.

Referring now to FIGURES 3 and 4, extending transversely outwardly within each chamber assembly 32 is a horizontal shaft 38 journalled at one end in a bearing 34 fixed to the inner side of the outer upright wall 26, and at its other end in a bearing 36 mounted at the inner side of the inner peripheral wall 98. Each shaft 38 is driven, through a coupling 41, by an appropriate motor means 40 mounted in a central engine or load-carrying compartment 28 of the vehicle 10. Although a single motor for each shaft 38 is illustrated in the drawings, it will be evident that all of the shafts may be driven through conventional gearing or the like from a common motor. Similarly, the motor means 40 may be an internal combustion engine, an electric motor, or other appropriate source of rotary power.

Fixedly mounted on and spaced along the shaft 38 are impeller hubs 42, 44, and 46 carrying air impeller blades 42', 44', and 46' respectively, for moving air outwardly of the vehicle 10 toward the outer peripheral wall 26, i.e. from right to left as shown in FIGURE 4. The blades 42', 44', and 46' are disposed in circular ducting openings in upright walls 54, 56 and 58, respectively, which extend to and between the end walls 100. Preferably, the edges of the respective openings are provided with radially inwardly extending stator blades 60, 62, and 64 respectively, which are arranged in cooperating relationship with the impeller blades, as shown in FIGURE 4, in order to smooth and straighten the flow of air emerging from the circular openings in each of the walls 54, 56, and 58. The upper edges of the walls 54, 56, and 58 are spaced below the top assembly wall 94 and are spanned by an upper horizontal wall 96 which extends to and between the end walls 100 and to and between the inner upright wall 54 and an outer upright wall 92. The latter wall extends to and between the end walls 100 intermediate the upright wall 58 and the outer upright bounding wall 26 of the assembly 32. The upright wall 54 is spaced outwardly of the inner bounding wall 98 of each assembly 32. Between the upright walls 54, 56 and 58 are two upright walls 83 and 84.

It will be seen that the foregoing construction defines three exhaust chambers 48', 50' and 52' into which air is blown by the impellers 42', 44' and 46', respectively. The lower edge portions of the walls 54, 83, 56, 84, 58 and 92 are spaced to form elongated nozzles 78, 80 and 82 for emitting from the exhaust chambers downwardly and inwardly directed jet-like curtains of air. Similarly, the foregoing construction defines inlet chambers 50 and 52 for supplying air to the respective impellers 44' and 46', air being drawn into each chamber through a lower elongated intake opening 56' and 58' respectively, which sucks up air directly from that flowing outwardly from the cushion A. The spacing between the walls 92 and 26, 94 and 96, and 98 and 54 defines an inverted generally U-shaped recirculation duct 90 having an outer elongated air intake opening 86 and terminating in an inlet chamber 48 for the impellers 42'.

In order to improve the aerodynamic efficiency of each assembly 32 and to make for a smooth flow of air into and from the several exhaust and inlet chambers, those edge portions of the walls 98, 83, 84 and 92 surrounding the shaft 38 are provided with conoidal configurations 49, 66, 76, 68, 69 and 70 smoothly fared into the periphery of the corresponding impeller hubs 42, 44 and 46. Similarly, for improved aerodynamic efficiency and for more uniform distribution of the flow of air along the length of the several intake openings and exhaust nozzles, each of such openings and nozzles is transversely spanned by a plurality of spaced flow-straightening vanes 87, while the corresponding inlet and exhaust chambers are transversely spanned by a plurality of flow-turning vanes 104 arranged symmetrically on opposite sides of a vertical plane which includes the axis of the shaft 38, such vanes serving to direct air smoothly and uniformly to or from the corresponding impellers from or to the corresponding intake openings or curtain-forming nozzles. For like reasons, the upper portions of the inlet and exhaust chambers 48', 50, 50', 52 and 52' and the lower portions of the inlet chamber 48, have concavely-curved corner and center portions 106.

It will be understood that the several nozzles and air intake openings of each assembly 32 are aligned with the corresponding nozzles and openings of adjacent assemblies. Furthermore, it will be appreciated that each of the chamber assemblies 32 provides for an even lengthwise distribution of air flow through its several nozzles and intake openings by virtue of the configuration of the inlet and exhaust chambers and of the position and configuration of the guide vanes 87 and 104.

*Operation*

The motor means 40 are operated, thereby driving the impellers 42', 44' and 46' by the shafts 38. The air is moved by the impellers in paths as shown generally by the arrows in FIGURE 4, thereby providing downwardly and inwardly directed peripheral jets or curtains of air from the inner nozzles 78 of the several assemblies 32. Such jets form a substantially continuous curtain which creates a cushion A under superatmospheric pressure sufficient to raise the vehicle 10 to a stable elevation above the ground G. A large part of air flowing outwardly from the cushion A will then be sucked up through the several intake openings 56' into the corresponding inlet chambers 50 from whence it will be blown by the impellers 44' into the exhaust chambers 50' for emission from the aligned nozzles 80 in the form of another downwardly and inwardly directed substantially continuous peripheral jet. The cycle will again be repeated, depending upon the number of impellers and corresponding inlet and exhaust chambers that it is desired to include in each assembly 32. Finally, at least a large proportion of the air which attempts to flow outwardly from beneath the lower edge of the peripheral wall 26 will be sucked up into the intake openings 86 of the recirculation ducts 90 and returned to the inlet chambers 48 for the inner impellers 42'.

The benefits and advantages of such labyrinth sealing and recirculation systems are detailed in applicant's aforementioned applications, so there is no need for a reiteration here. It is pointed out, however, that by virtue of the farings 49, 66, 76, 68, 69 and 70, and of the guiding vanes 87 and 104, not only is increased aerodynamic efficiency imparted to the system but also a more uniform distribution of air flow is had along the length of each intake opeining and curtain-forming nozzle, thus minimizing the number of impeller shafts that it is necessary to use per increment of length of the peripheral jet.

I claim:

1. In a peripheral jet ground effect vehicle having an air-tight undersurface, the combination comprising: a plurality of closely adjacent chamber assemblies carried by said vehicle and arranged along a peripheral portion of said undersurface, each of said assemblies including an upright wall extending generally parallel to the periphery of said vehicle and having a circular opening therein; impeller means mounted within said opening for rotation about the axis thereof for blowing air therethrough from the inner to the outer side of said wall; means including said wall defining an exhaust chamber for receiving air directly from said opening, the lower portion of said chamber defining a downwardly and inwardly directed elongated nozzle for creating a section of a peripheral jet; and vane means within said chamber for smoothly directing the flow of air from said opening toward said nozzle and uniformly distributing the flow of air along the length thereof.

2. The structure defined in claim 1 in which the chamber-defining means includes a wall generally parallel to the upright wall and having a generally conoidal fairing portion coaxial with the opening and terminating in an edge closely adjacent the periphery of the hub of the impeller means.

3. The structure defined in claim 1 including stator blades projecting radially inwardly from the edge of the opening and cooperating with the impeller means to straighten and smooth the flow of air into the chamber.

4. The structure defined in claim 1 including means including the wall defining an inlet chamber for supplying air to the impeller means, and vane means within said inlet chamber for smoothly directing the flow of air therein uniformly toward the opening about the entire periphery thereof.

5. In a peripheral jet ground effect vehicle having an air-tight undersurface, the combination comprising: means carried by said vehicle, including an elongated nozzle extending along at least a section of the periphery of said undersurface, for creating and directing a jet like curtain of air downwardly and inwardly along said section; a plurality of closely-adjacent chamber assemblies carried by said vehicle and arranged along said section, each of said assemblies including an upright wall extending generally parallel to said nozzle outwardly thereof and having a circular opening; impeller means mounted within said opening for rotation about the axis thereof for blowing air therethrough from the inner to the outer side of said wall; means including said wall defining inlet and exhaust chambers on the inner and outer sides of said wall, the lower portion of said inlet chamber defining an elongated intake opening parallel to and closely adjacent said nozzle and the lower portion of said exhaust chamber defining a second elongated nozzle parallel to and closely adjacent said intake opening for directing a second jet-like curtain of air downwardly and inwardly of said section outwardly of said first-mentioned curtain; and vane means within said exhaust chamber for smoothly directing the flow of air from said opening toward said second nozzle and uniformly distributing said flow along the length thereof.

6. The structure defined in claim 5 including vane means within the inlet chamber for smoothly directing the flow of air from the intake opening uniformly toward the wall opening about the entire periphery thereof.

7. The structure defined in claim 6 in which the means defining the chambers includes second and third upright walls generally parallel to the first-mentioned wall at the inner and outer sides thereof, respectively, said second and third walls each having a conoidal fairing portion coaxial with the wall opening and terminating in an edge closely adjacent the periphery of the hub of the impeller means.

8. The structure defined in claim 7 including stator blades projecting radially inwardly from the edge of the opening and cooperating with the impeller means to straighten and smooth the flow of air into the exhaust chamber.

References Cited by the Examiner

UNITED STATES PATENTS

| | | | |
|---|---|---|---|
| 832,256 | 10/1906 | Guy | 230—119 X |
| 1,907,160 | 5/1933 | Schauman. | |
| 2,038,417 | 4/1936 | Colby | 230—129 |
| 2,838,257 | 6/1958 | Wibault. | |
| 2,974,857 | 3/1961 | Schwaar | 230—119 |

FOREIGN PATENTS

| | | |
|---|---|---|
| 229,914 | 8/1960 | Australia. |
| 1,238,499 | 8/1959 | France. |
| 1,240,721 | 8/1960 | France. |

OTHER REFERENCES

Publication, "Symposium on Ground Effect Phenomena."

Publication, "Remarks on the Ground-Effect Machine," by G. D. Boehler presented Sept. 25, 1958, before the American Helicopter Society Fifth Annual Forum.

Publication, "Symposium on Ground Effect Phenomena," Oct. 21–23, 1959, pages 111 through 118.

A. HARRY LEVY, *Primary Examiner.*

GEORGE HYMAN, JR., *Examiner.*